Nov. 22, 1927.  1,650,334
C. J. E. ELIASON
VEHICLE FOR SNOW TRAVEL
Filed March 3, 1927  4 Sheets-Sheet 1
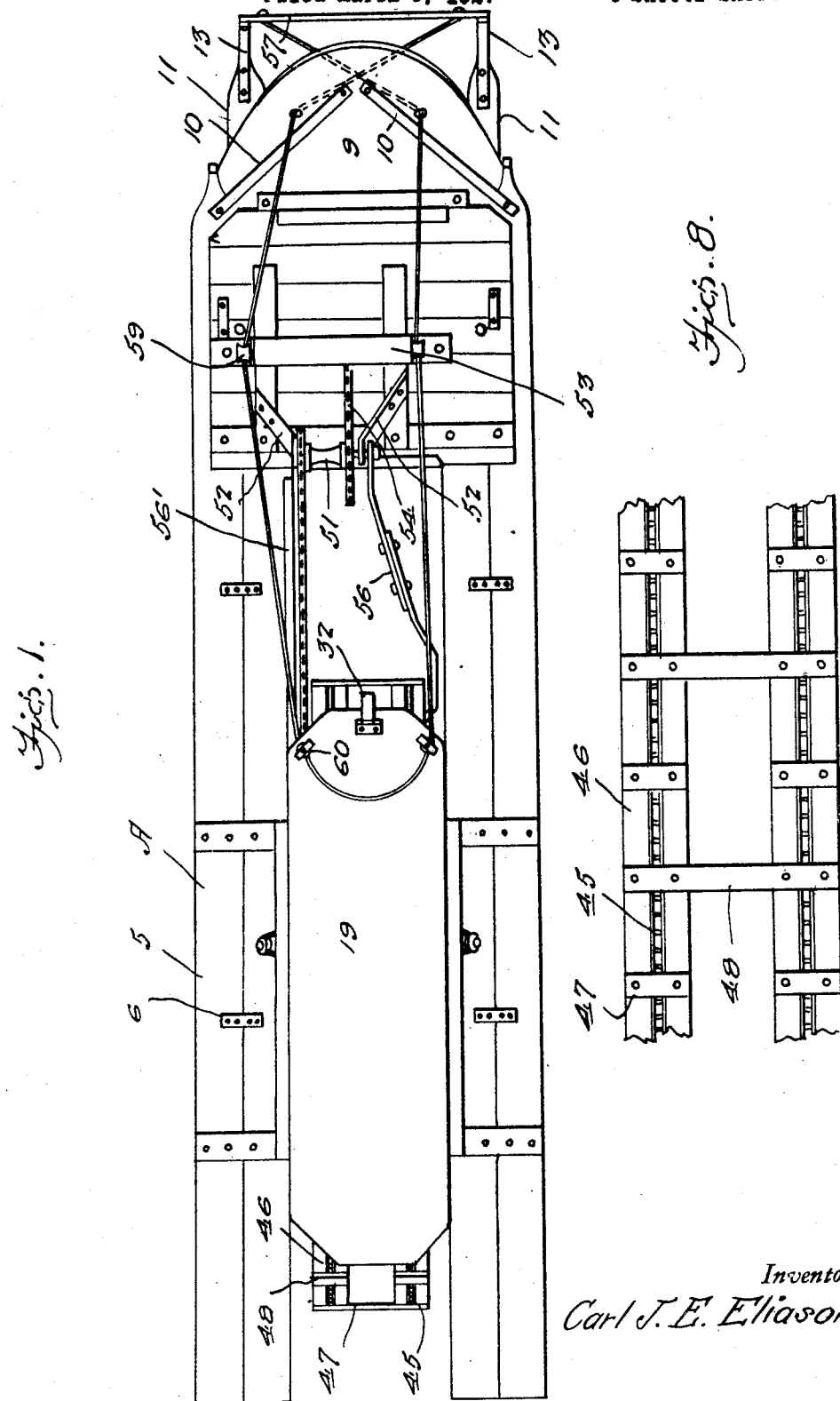
Inventor
Carl J. E. Eliason
By Clarence A. O'Brien
Attorney

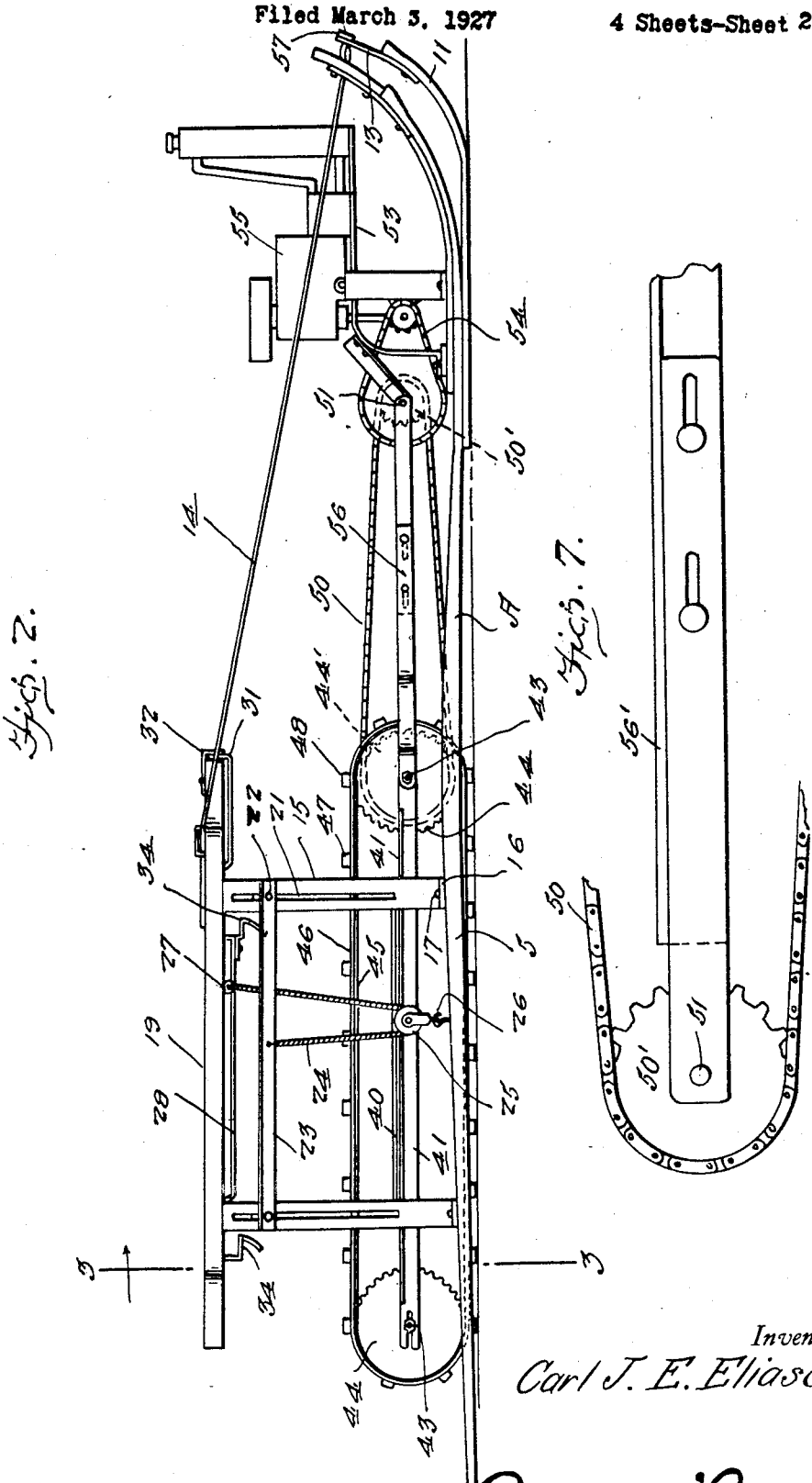

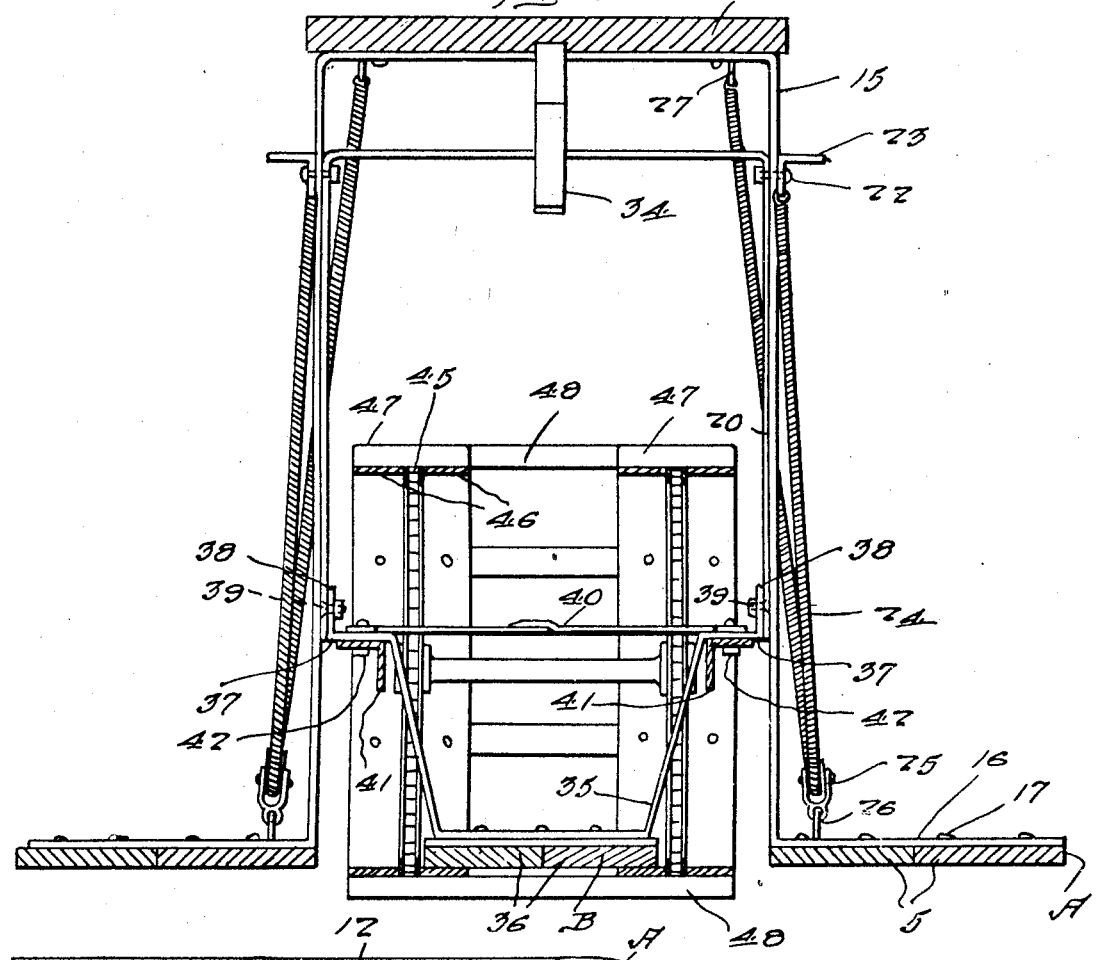

Nov. 22, 1927.
C. J. E. ELIASON
1,650,334
VEHICLE FOR SNOW TRAVEL
Filed March 3, 1927
4 Sheets-Sheet 4
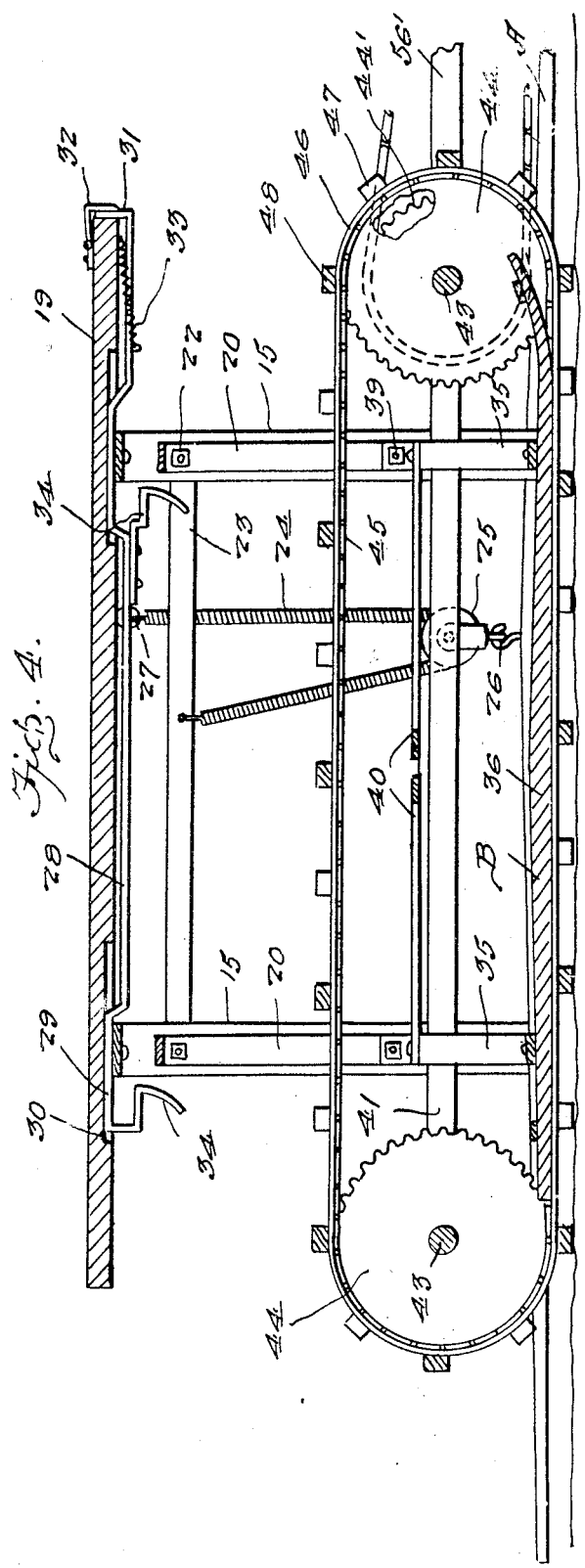
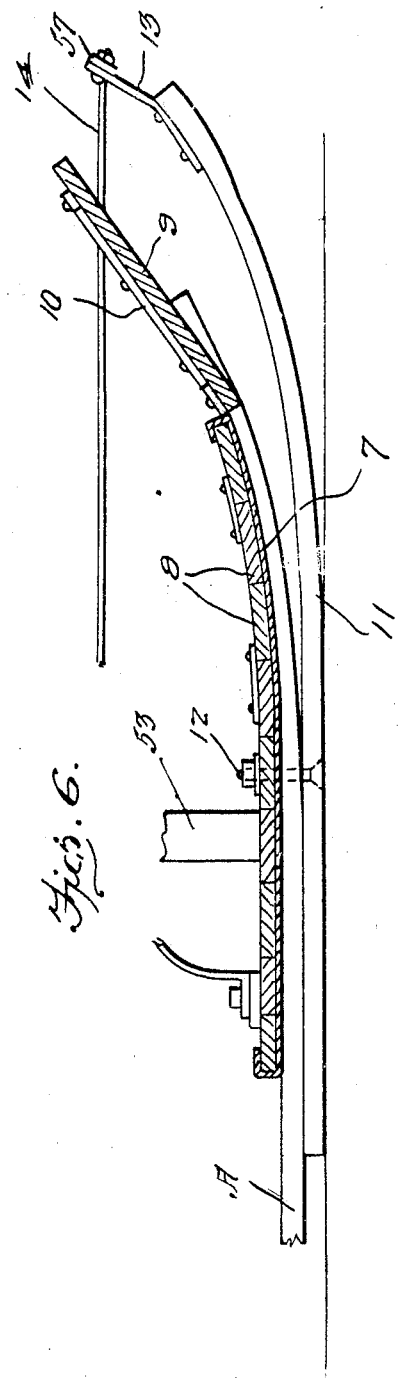
Inventor
Carl J. E. Eliason
By *Clarence A. O'Brien*
Attorney Patented Nov. 22, 1927.

1,650,334

UNITED STATES PATENT OFFICE.

CARL J. E. ELIASON, OF SAYNER, WISCONSIN.

VEHICLE FOR SNOW TRAVEL.

Application filed March 3, 1927. Serial No. 172,353.

The present invention relates to a vehicle for snow travel and has for its prime object to provide a supporting structure mounted on runners carrying a driving mechanism which may be lowered in engagement with the snow and has an endless tread structure movable to propel the vehicle.

Another important object of the invention lies in the provision of a vehicle of this nature mounted on runners with a driving mechanism that is spring-pressed into engagement with the ground.

Another important object of the invention lies in the provision of a vehicle of this nature mounted on runners which is provided with a driving mechanism that may be held raised in an inoperative position out of engagement with the ground for coasting purposes.

Another very important object of the invention lies in the provision of a vehicle of this nature mounted on runners which are provided with auxiliary runners that may be steered in a convenient manner.

A still further very important object of the invention resides in the provision of a vehicle of this nature which is simple in its construction, strong and durable, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of the vehicle embodying the features of my invention, Figure 2 is a side elevation thereof, Figure 3 is a vertical transverse section therethrough taken substantially on the line 3—3 of Fig. 2, Figure 4 is a fragmentary longitudinal section taken through the vehicle, Figure 5 is a fragmentary bottom plan view of the forward end of the vehicle, Figure 6 is a vertical longitudinal section through the mechanism shown in Figure 5, Figure 7 is an enlarged detail elevation showing one of the extensible thrust rods, Figure 8 is an enlarged detail plan view of the endless tread member.

Referring to the drawings in detail, it will be seen that the letters A denote a pair of spaced parallel runners which are preferably constructed of skies 5, there being two skies to each runner fastened together alongside of each other by strap irons 6. The forward ends of these runners A curve upwardly as is clearly indicated in Figure 6 of the drawing. A sheet of metal 7 is disposed across the forward ends of the runners and has mounted thereon a plurality of cross boards 8. An extension board 9 projects forwardly and inclines upwardly from the forward end of the sheet 7 and is held in place by bars 10 riveted to the upper surface thereof. These bars 10 diverge rearwardly from each other and are fastened to the forward ends of the runners A. A pair of auxiliary runners 11 are pivoted intermediate their ends as at 12 to the forward portions of runners A and these auxiliary runners terminate forwardly of the runners A and have their forward ends curved upwardly and provided with brackets 13 having a steering rope or cable 14 associated therewith. A pair of inverted U-shaped frame members 15 have laterally and outwardly extending terminal portions 16 securely fastened in any suitable manner as at 17 to the upper surfaces of the runners A. These frames are disposed to the rear of the runners A, the forward frame being approximately at the center thereof and the rear member 15 being approximately equidistant from the forward frame member and the rear ends of the runners.

This location of the frame member 15 is preferable but by no means necessary. A platform 19 is supported on the bight portions of the inverted U-shaped frame members 15 and functions as a seat for passengers or for any other suitable purpose. A pair of inverted auxiliary U-shaped frame members 20 are disposed one within each frame member 15. The sides of the frame members 15 are slotted as is indicated at 21. Bolts 22 extend from the sides of the auxiliary frame members 20 adjacent their bight portions outwardly through the slots 21 and are connected to longitudinally extending bars 23. Springs 24 are attached to the intermediate portions of the longitudinal bars 23 and are trained over pulleys 25 the frames of which are engaged with hooks 26 fixed on the runners A and then the springs extend upwardly and are attached as at 27 to the platform 15, thereby urging the auxiliary frame structure downwardly. A bar 28 has offset portions 29 slidable in longitudinal recesses 30 formed in the lower surface of the platform 19 and above the bight of the frames 15. One end of this bar 28 has an upwardly projecting lip 31 over which is adapted to engage a hinged hook 32 for holding the bar 28 in the position shown in Figure 4. A spring 33 is attached to the bar 28 and to the platform 19 and normally urges the bar 28 forwardly so that a pair of hooked members 34 mounted on this bar engage the bight portion of auxiliary frame members 20 to hold the same in a raised position with the springs 24 tensioned.

A pair of U-shaped frame members 35 have their bights fixed transversely to a runner B which is formed from two skies 36 disposed alongside of each other and of much shorter length than the main runners being confined well within the ends thereof. The upper ends of the U-shaped frame members 35 are offset outwardly and laterally as at 37 and these offset portions 37 merge into upstanding portions 38 which are pivoted as at 39 to the lower ends of auxiliary inverted U-shaped frame members 20. Cross braces 40 are attached to the offset portions 37 and are disposed diagonally of the apparatus. A pair of longitudinal frame bars 41 are attached below the offset extensions 37 by bolts 42 which also attach thereto the ends of the braces 40. Shafts 43 are journaled in the front and rear extremities of the bars 41. On each shaft 43 there is fixed a pair of sprockets 44 over which are trained chains 45. Flexible strips 46 are disposed one on each side of each chain 45 and are connected together by cleats 47. The pairs of strips are connected to each other by cross cleats 48. The two inner strips 46 are adapted to move under the outer portions of the lower surfaces of the skies 36 as is clearly seen in Figure 3. The forward shaft 43 has an additional sprocket 44' thereon over which is trained a drive chain 50 trained over a sprocket 50' on a shaft 51 journaled in brackets 52 on an engine supporting structure 53 at the forward ends of the runners above the boards 8 heretofore referred to. A chain drive connection 54 is provided between the shaft 51 and an out-board motor 55 carried on the support 53. It is apparent that any other suitable source of power may be used in place of the out-board motor shown. A pair of sectional extensible thrust rods 56 and 56' connect the shaft 51 with the forward shaft 43.

When the prime mover 55 is in operation it will be seen that the endless tread structure described in detail above is placed in motion to engage the snow and cause the vehicle to travel forwardly. This tread structure is maintained in firm engagement with the snow because of springs 24. If an opportunity presents itself of coasting it will be seen that the auxiliary frame structure supporting the said tread structure may be raised and held raised by hooks 34 on the bar 28 as was heretofore described.

The brackets 13 are preferably connected by cross bars 57 to which the ends of the rope 14 are attached. The runs of the rope cross each other as indicated in Fig. 5 and then pass through openings 58 in the extension boards 9 and are trained through pulleys 59 on the engine supporting frame structure 53 and through suitable guides 60 on the forward portion of the platform 19 so that this steering rope is within easy command of a person sitting on the front of the platform to guide the vehicle as may be desired. The thrust created by the endless tread is delivered to the runners through the extensible rods 56 and 56' to the motor frame structure and then to the runners so that they are pushed from adjacent their forward ends to insure proper operation and to allow the necessary flexibility in the entire structure. Obviously, as the driving mechanism formed by the tread structure and the auxiliary frame moves up and down because of unevenness of the pathway it will be seen that the auxiliary frames 20 will not only raise up and down but will rock on the bolts 22 because of this connection by the bars 56 and 56' with the motor frame 53. This is the reason for providing pivots 39 and the pivot connection of the bars 56 and 56' with the shaft 43 and the motor frame supporting structure.

It is thought that the construction, operation, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A vehicle of the class described comprising a pair of parallel spaced runners, a frame structure rising from the runners, an auxiliary frame structure, means for mounting the auxiliary frame structure in the first frame structure for vertical movement therein, a pair of bars mounted in the auxiliary frame structure to extend longitudinally of the vehicle in spaced parallelism, a pair of shafts journaled between the ends of the bars, a pair of sprockets on each shaft, chains trained over said sprockets, endless strips one on each side of each chain, means connecting the strips, a pair of runners mounted in the auxiliary frame above the lower runs of the two inner strips.

2. A vehicle of the class described comprising a pair of parallel spaced runners, a frame structure rising from the runners, an auxiliary frame structure, means for mounting the auxiliary frame structure in the first frame structure for vertical movement therein, a pair of bars mounted in the auxiliary frame structure to extend longitudinally of the vehicle in spaced parallelism, a pair of shafts journaled between the ends of the bars, a pair of sprockets on each shaft, chains trained over said sprockets, endless strips one on each side of each chain, means connecting the strips, a pair of runners mounted in the auxiliary frame above the lower runs of the two inner strips, spring means urging the auxiliary frame downwardly.

3. A vehicle of the class described comprising a pair of parallel spaced runners, a frame structure rising from the runners, an auxiliary frame structure, means for mounting the auxiliary frame structure in the first frame structure for vertical movement therein, a pair of bars mounted in the auxiliary frame structure to extend longitudinally of the vehicle in spaced parallelism, a pair of shafts journaled between the ends of the bars, a pair of sprockets on each shaft, chains trained over said sprockets, endless strips one on each side of each chain, means connecting the strips, a pair of runners mounted in the auxiliary frame above the lower runs of the two inner strips, spring means urging the auxiliary frame downwardly, a member slidable in the main frame and engageable with the auxiliary frame to hold it in a raised position.

In testimony whereof I affix my signature.

CARL J. E. ELIASON.